United States Patent
Vahid

(10) Patent No.: US 9,468,227 B2
(45) Date of Patent: Oct. 18, 2016

(54) MULTI-SECTIONAL COOKING SYSTEM

(76) Inventor: Javid Vahid, Dana Point, CA (US)

(*) Notice: Subject to any disclaimer, the term of this patent is extended or adjusted under 35 U.S.C. 154(b) by 482 days.

(21) Appl. No.: 13/613,466

(22) Filed: Sep. 13, 2012

(65) Prior Publication Data

US 2013/0011537 A1 Jan. 10, 2013

(51) Int. Cl.
| | |
|---|---|
| *A47J 39/00* | (2006.01) |
| *A23L 1/01* | (2006.01) |
| *A47J 27/13* | (2006.01) |
| *A47J 27/62* | (2006.01) |

(52) U.S. Cl.
CPC ............. *A23L 1/0128* (2013.01); *A47J 27/13* (2013.01); *A47J 27/62* (2013.01)

(58) Field of Classification Search
CPC ......... A47J 39/006; A47J 43/18; A47J 27/04
USPC ......... 99/448, 413, 416, 329, 280, 281, 389, 99/470, 468, 483; 219/432, 433, 416, 386, 219/391, 385, 390, 401, 441; 426/520, 524, 426/523; 3/448, 413, 416, 329, 280, 281, 3/389
See application file for complete search history.

(56) References Cited

U.S. PATENT DOCUMENTS

| | | | |
|---|---|---|---|
| 2,731,539 A * | 1/1956 | Pavelka, Jr. | 219/417 |
| 4,670,282 A * | 6/1987 | Onishi et al. | 426/508 |
| 5,302,792 A * | 4/1994 | No et al. | 219/754 |
| 6,196,113 B1 * | 3/2001 | Yung | 99/327 |
| 6,927,365 B2 * | 8/2005 | Li | 219/432 |
| 8,307,761 B1 * | 11/2012 | Shackelford | 99/470 |
| 2004/0094532 A1 | 5/2004 | Li | |
| 2004/0098888 A1 * | 5/2004 | Ukida et al. | 40/299.01 |
| 2006/0182862 A1 * | 8/2006 | Ely et al. | 426/523 |
| 2009/0095166 A1 * | 4/2009 | Jian | 99/330 |

FOREIGN PATENT DOCUMENTS

| | | |
|---|---|---|
| CN | 2914926 | 6/2007 |
| CN | 2914929 | 6/2007 |
| CN | 201085503 | 7/2008 |
| CN | 201360945 | 12/2009 |
| JP | 2000201809 | 7/2000 |
| JP | 2003111669 | 4/2003 |
| JP | 2010184053 | 8/2010 |
| KR | 449097 | 6/2010 |

OTHER PUBLICATIONS

Rospatent, International Search Report and Written Opinion for PCT/US 2013/059729, mailed Dec. 26, 2013.

* cited by examiner

*Primary Examiner* — Phuong Nguyen
(74) *Attorney, Agent, or Firm* — CIONCA Law Group P.C.; Marin Cionca

(57) ABSTRACT

A cooking system having several inner containers, wherein a set of cooking parameters for each inner container is independently selectable, thus, permitting the automatic and simultaneous preparation of different style, recipe or taste of food in each of the plurality of the inner containers.

13 Claims, 12 Drawing Sheets

MULTI-SECTIONAL COOKING SYSTEM

CROSS-REFERENCE TO RELATED APPLICATIONS

Not applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to kitchen appliances and particularly to rice cookers.

2. Description of the Related Art

Automatic and simultaneous cooking of different styles, recipes or taste of rice using the same rice cooker is currently not feasible, since conventional rice cookers have one compartment only, and therefore, for different styles, recipes and/or tastes of rice, different rice cookers are required. This is particularly costly, cumbersome and time consuming when, for example, different members of a family, which according to its tradition prepares rice very often, or different invitees to a party, have different preferences for style, recipe and/or taste of cooked rice. Thus, there is a need for a new and improved rice cooker that addresses these problems.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment a multi-sectional rice cooker is provided which may be configured to fit, three, two, or a single compartment for controlled cooking of different or same style, recipe and/or taste of rice. Thus, an advantage is that a user may simultaneously and automatically cook different style, recipe and/or taste of rice, when, for example, different members of a family prefer that the rice be cooked specifically to their taste. Another advantage is rice cooker's versatility. For example, if all members of a family agree on one particular type of rice, then, the multi-sectional rice cooker may become a one-compartment rice cooker, and thus, it may be used for cooking same rice for the entire family.

In one aspect, automatic recognition is provided of how many compartments are operational at a given time. In another aspect, under the compartments, springs are provided that pop the compartments up while the main lid is fully opened.

The above embodiment and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 1b illustrates a back-perspective view of the rice cooker from FIG. 1a.

FIG. 2a illustrates the front view of the rice cooker from FIG. 1a.

FIG. 2b illustrates the top view of the rice cooker from FIG. 1a.

FIG. 2c illustrates the bottom view of the rice cooker from FIG. 1a.

FIG. 2d illustrates the left-side view of the rice cooker from FIG. 1a.

FIG. 2e illustrates the right-side view of the rice cooker from FIG. 1a.

FIG. 2f illustrates a back view of the rice cooker from FIG. 1a.

FIG. 3b illustrates a sectional view of the rice cooker from FIG. 3a.

FIG. 4b illustrates a sectional view of the rice cooker from FIG. 4a.

FIG. 5b illustrates a sectional view of the rice cooker from FIG. 5a.

DETAILED DESCRIPTION OF THE PREFERRED EMBODIMENTS

Figure 1A:
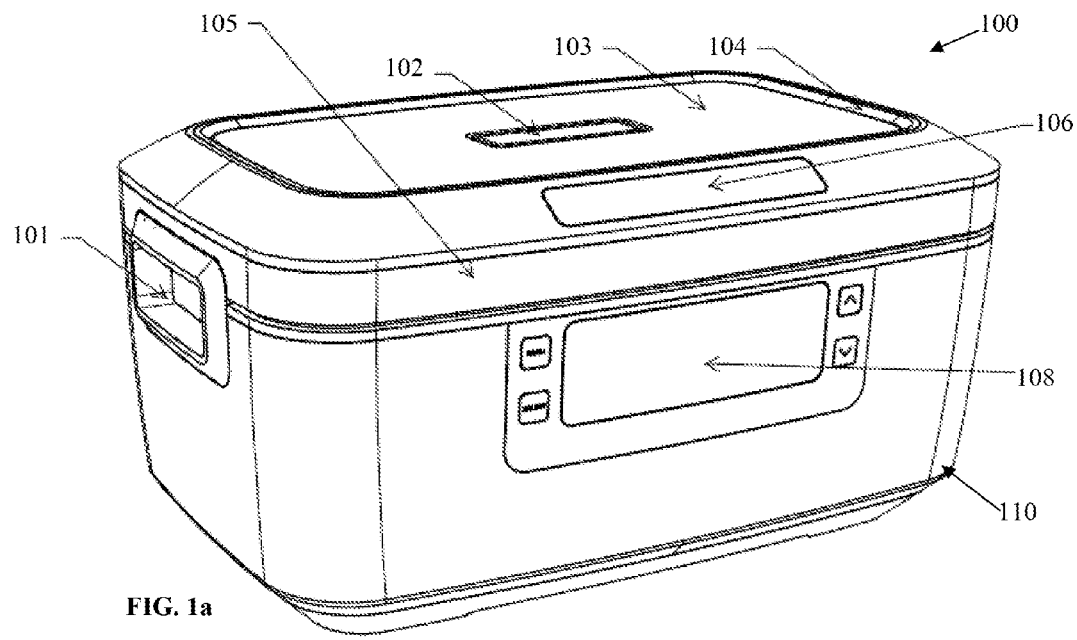
FIG. 1a illustrates a front-perspective view of a rice cooker according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

Figure 1B:
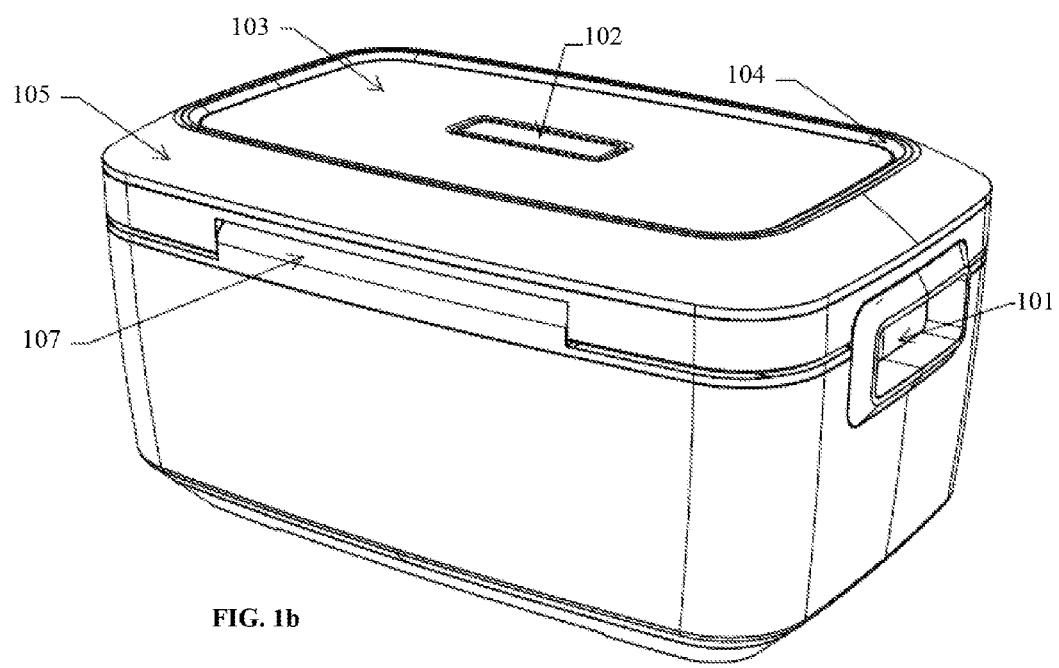
Figure 2B:
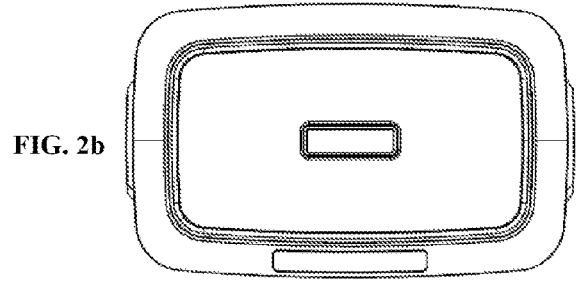
Figure 2D:
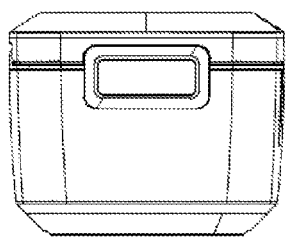
Figure 2A:
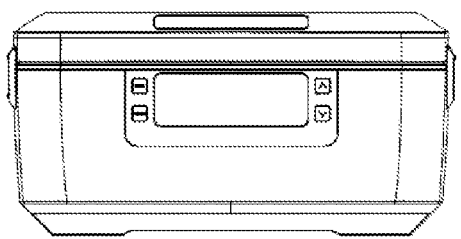
Figure 2E:
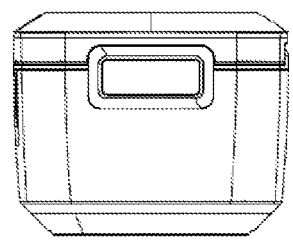
Figure 2C:
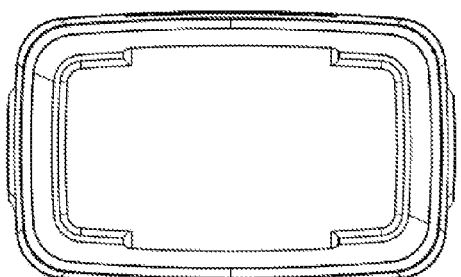
Figure 2F:
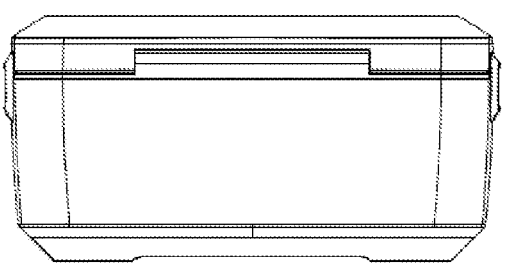

FIGS. 1a-b illustrate a front and a back perspective view, respectively, of a rice cooker according to an embodiment. As shown, the rice cooker 100 includes a main housing 110 and a main lid 105 associated with each other through a hinge 107 (FIG. 1b) located in the back of rice cooker 100. The hinge 107 may be any standard hinge such as a barrel or a pivot hinge. When the main lid 105 is closed as shown in FIGS. 1a-b, automatic locking, or the option to lock, is preferably offered to the user so that the main lid 105 is secured (such as for safety reasons) to the main housing 110 using typically a standard locking mechanism (not shown), such as an electromagnetic lock. In combination with such a locking mechanism, a release/unlock button (such as a push button) 106 may be provided to allow for the manual or the automatic opening of main lid 107 (such as when main lid 107 is spring loaded when closed).

The main housing 110 may be made from known suitable materials such as ABS plastic or aluminum. The inner containers (see for example 316 in FIGS. 3a-b) may be made from materials such as stainless steel, aluminum, copper, ceramic and so on.

The main lid 105 may have a transparent portion 103 made from materials such as plexiglass and sealed using, for example, a rubber gasket 104, to the remaining portion of main lead 105. The transparent portion 103 may improve the appearance of the cooker and it may allow for visual monitoring of the cooking, which in turn may give the user the feeling that she has better control over the cooking. Furthermore, for marketing purpose, the trademark under which the product is marketed may be placed in the product name area 102, in the center of the transparent portion 103 of main lid 105, by, for example, engraving it, affixing a tag, and so on.

It should be noted that, as depicted in FIGS. 1a-b, the rice cooker 100 has an indented handle 101 on each side, for easy and convenient grip during lifting and/or manipulation of rice cooker 100 such as for storage purposes. Furthermore, preferably in the front of main housing 110, a control and/or display panel 108, preferably a digital one, is available to the user. Through the panel 108 the user may set and/or monitor rice cooking parameters such as time and temperature.

Figure 3A:
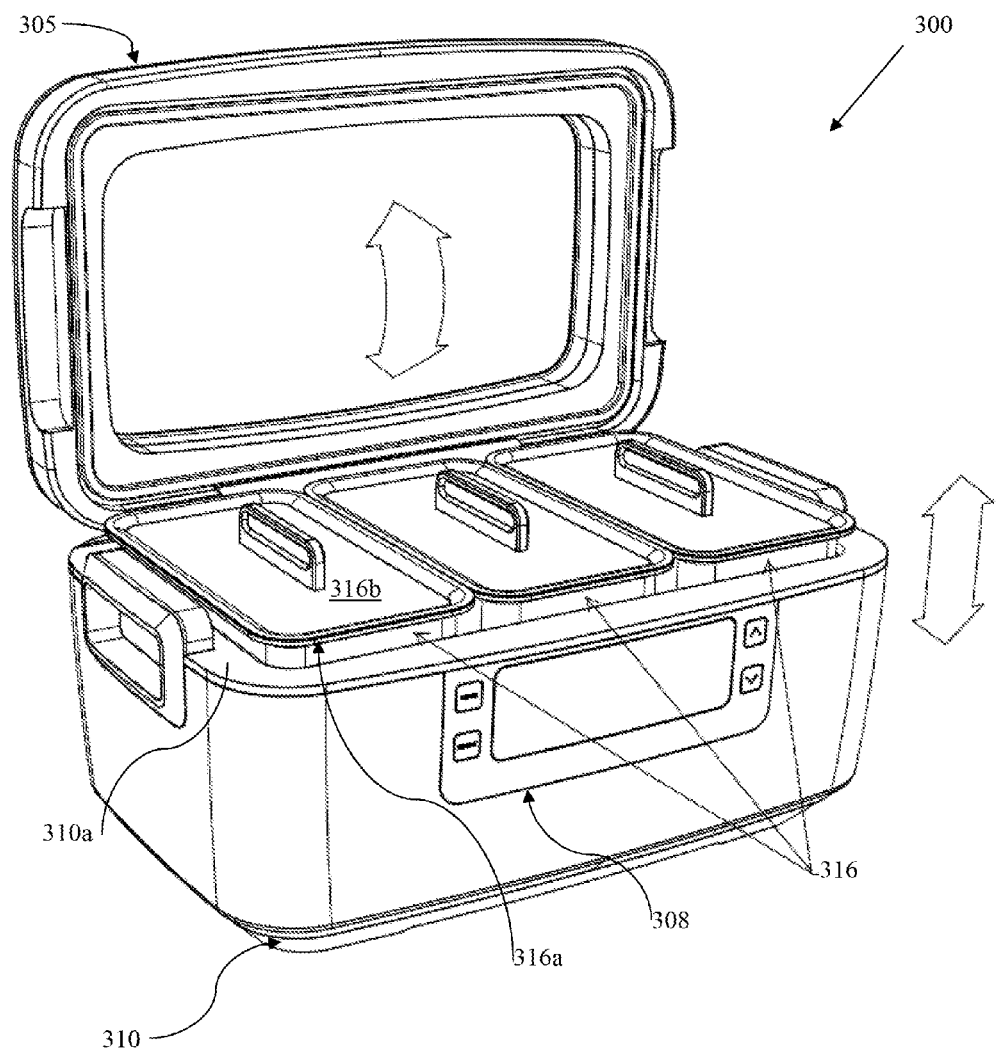
FIG. 3a illustrates a front-perspective view of a rice cooker with the lid open and having a three-container configuration, according to another embodiment.
Figure 3B:
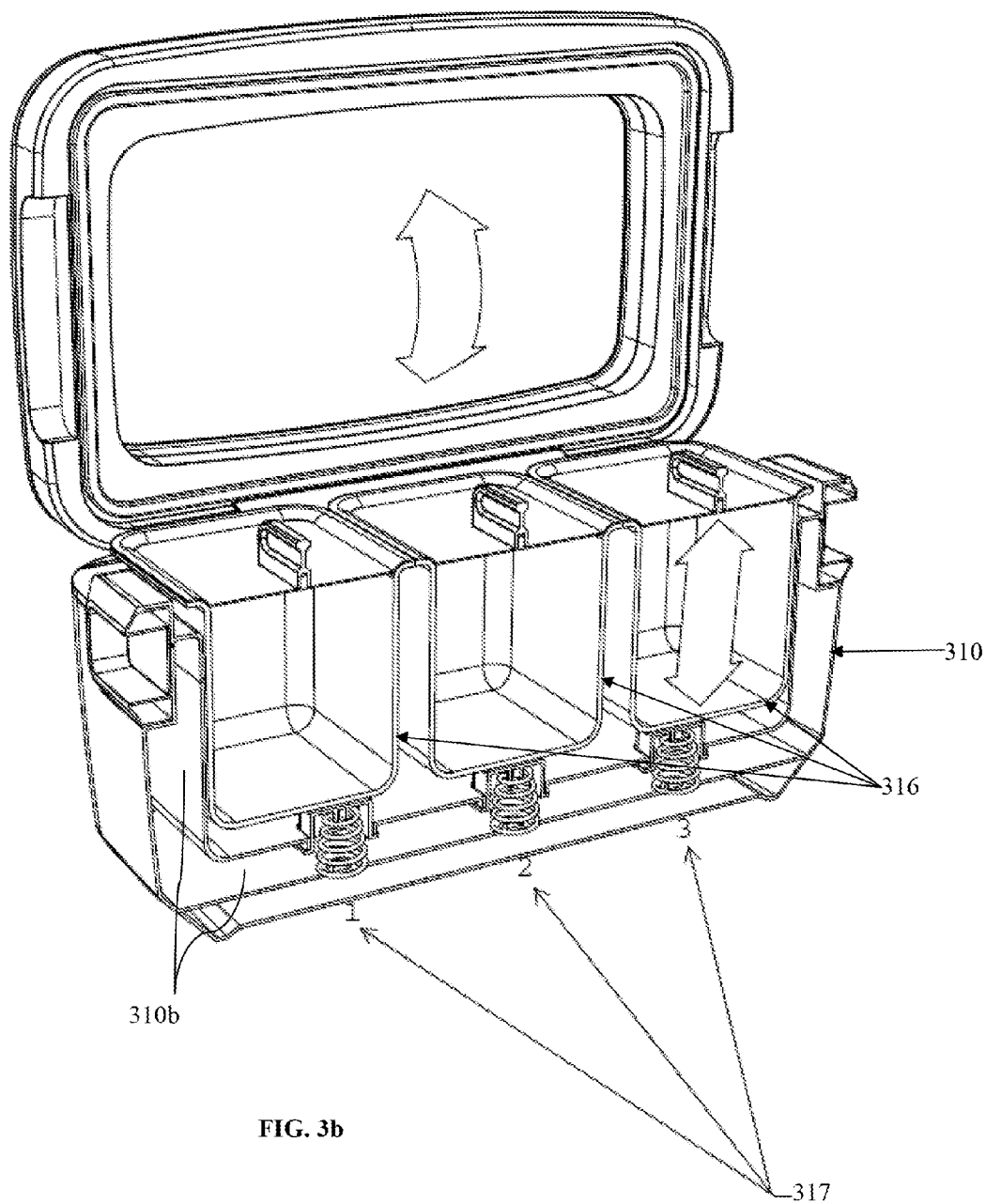

FIG. 3a illustrates a front-perspective view of a rice cooker 300 with the main lid 305 open and having a three-container configuration, according to another embodiment. FIG. 3b illustrates a sectional view of the rice cooker from FIG. 3a. As stated earlier, the multi-sectional rice cooker gives options to the user. For example, using a three inner container 316 configuration, the user may simultaneously cook three kinds of rice, for example, a Middle-Eastern rice (e.g., crunchy on the surface) in one container, an Eastern/Oriental rice (e.g., non-crunchy but spicy) in another container, and finally, an Italian rice (e.g., risotto). This, again, it is very convenient when, for example, a family has members, or a party has invitees, from these three different culinary cultures and regional cuisines.

It would be understood by one of ordinary skills in the art that, without departing from the scope of the invention, the rice cooker 300 may be configured to have more than three inner bowls/containers 316 (e.g., four or five) and that they may be substantially equal in size as shown in FIG. 3a, or they may have various sizes. For example, in a three-container configuration, one of the inner containers 316 could be smaller than the other two when a group of family members from a given culinary culture is smaller than the other two groups. To accommodate for such situations, the rice cooker 300 may be provided with, for example, a set of three equal inner containers 316 and a set of two relatively larger and one smaller container each set being configured to fit inside the rice cooker 300.

For exemplification purposes, the configuration with three equal inner containers 316 is depicted in FIGS. 3a-b, and thus, will be emphasized herein. It should be noted that, when the main lid 305 is open, the upper edge 316a, and thus, the inner lids 316b, of inner containers 316 are relatively higher than the upper surface 310a of main housing 310. This feature is advantageous when user needs to grasp on the inner containers 316 for the purpose of, for example, removing them from the rice cooker 300, and it is made possible by the springs (or other similarly compressible elements) 317 shown in FIG. 3b. As shown, each inner container is preferably actuated by a separate spring (or plurality of springs, not shown). The springs 317 are compressed under the influence of the weight of the main lid 305 on the inner containers 316, and thus, on springs 317, and/or a pressure/push action on the main lid 305 by the user, combined with the locking of the main lid as explained earlier, so that the springs 317 remain compressed while the main lid 305 is closed. Upon opening of the main lid 305, the springs 317 are decompressed and cause the lifting of the inner containers 316.

It should be noted that the inner containers may be heated, so that the cooking of the rice is possible, by any standard means known in the art, such as by using heating elements (not shown), including induction heating elements, resistors, etc, and the supporting circuitry (not shown) including but not limited to microprocessor for controlling cooking cycles, and other components (switches, sensors, etc) for, for example, turning the power on and off, controlling the power level, the cooking temperature, the cooking time, and so on. As described earlier, from the control panel 308 the user may preferably be provided the option to set and/or monitor rice cooking parameters such as time, temperature and/or power level, and so on, or a combination thereof. The setting of the cooking parameters is preferably individual for each inner container 316, such that different settings may be selected for each container, and thus, different types of rice may be cooked in each container. Furthermore, the heating element's supporting circuitry may be programmed such that the user may have the option to select from a list of rice types, by, for example, providing a push button for each type of rice on the control panel 308, which when activated, automatically sets the cooking parameters for the respective type of rice, desired to be cooked in a given inner container 316. It should be understood that in the inner containers 316, dishes other than rice, such as soup, stew, porridge, and so on, may potentially be cooked the same way as explained above.

The rice cooker 300 is also preferably configured to provide automatic recognition, and displaying on the display portion of panel 308, of how many inner containers 316 are operational at a certain time. This means one less concern or task to be performed by the user, who in most parts may be a non-technical person. The automatic recognition may be achieved by, for example, detecting, such as by using weight/load sensors, the weight load pressing on springs/compressible elements 317. As shown in FIG. 3b, the rice cooker may have three springs/compressible elements 317, one for each of three inner containers 316. Thus, for example, when only the two distal elements (317) are actuated, such as when the three inner containers 316 are replaced with only two larger inner containers 440 (see FIGS. 4a-b), the middle element is free, therefore, its sensor, switches, etc, will not detect any weight load, and thus, the display of panel 408 will show that only two inner containers are in operation.

In another example, when, of the three inner containers 316, only the one on the left is operational, the display portion of panel 308 may show, for example, "1L." Similarly, when the containers in the center and on the right are in use, "1C" and "1R" may be shown to user.

Figure 5A:
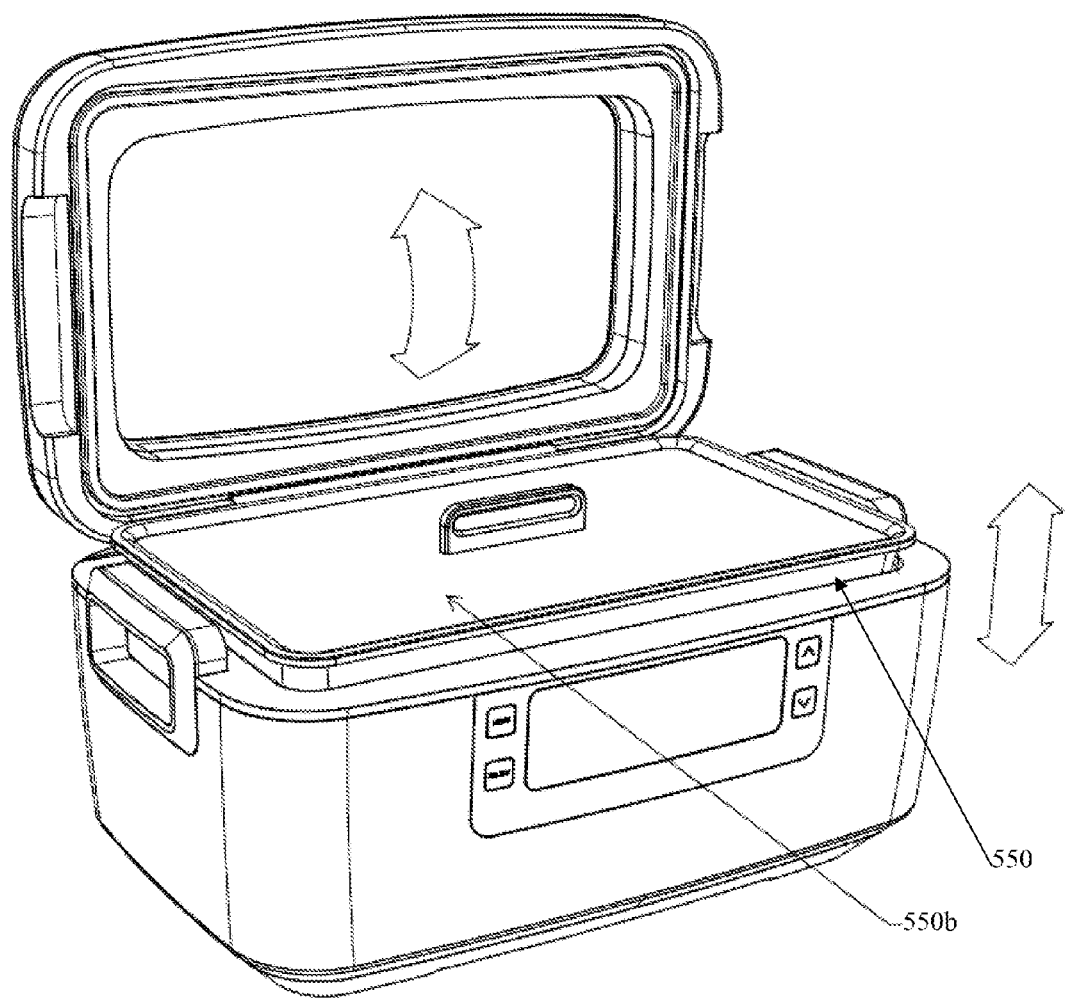
FIG. 5a illustrates a front-perspective view of a rice cooker with the lid open and having a one-container configuration, according to another embodiment.
Figure 5B:
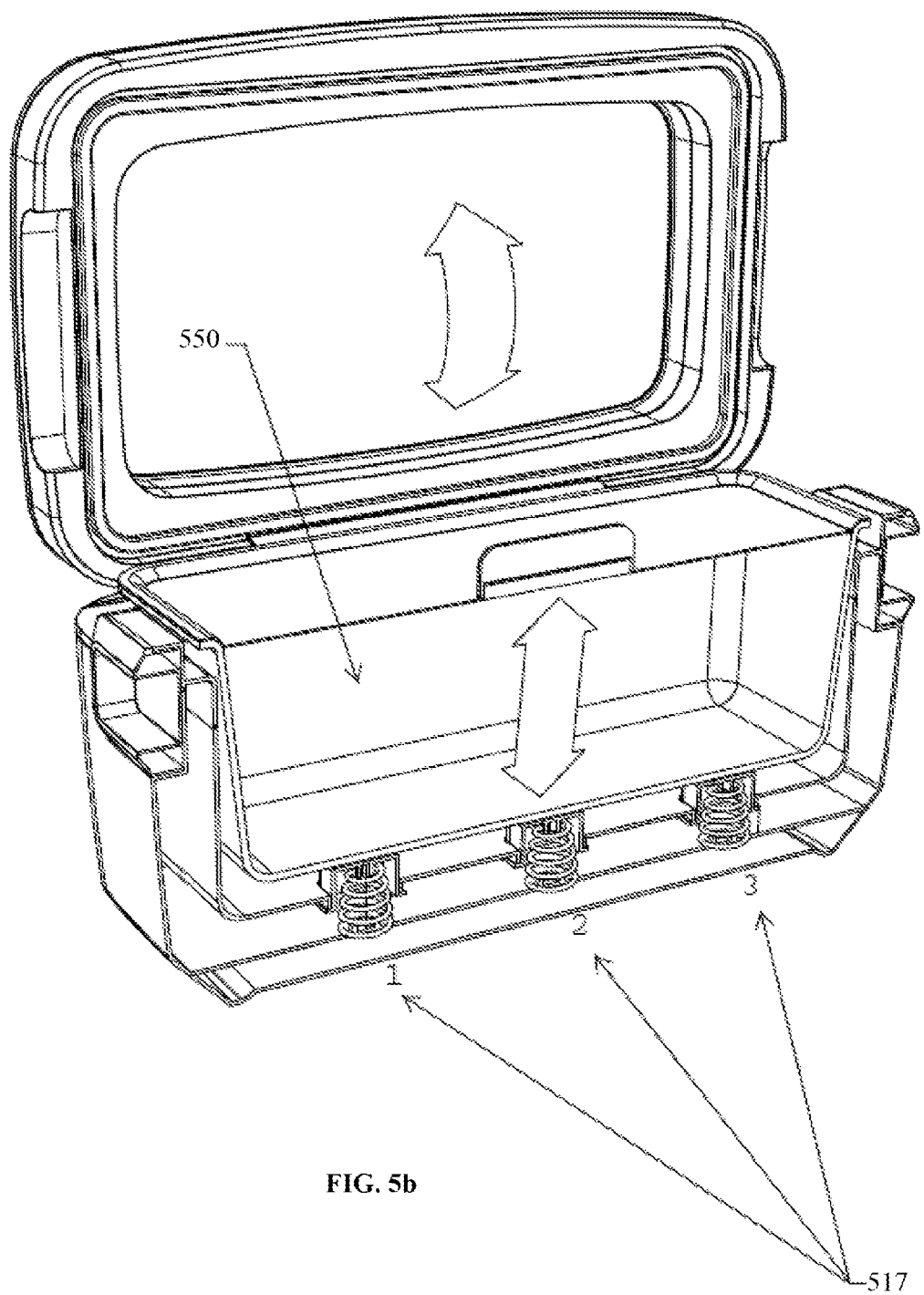

Yet another example, when the three inner containers 316 from FIG. 3a are replaced with a single large bowl 550 as shown in FIGS. 5a-b, then the weight of the one container 550 will be distributed to the three springs/compressible elements 517. Thus, each spring/compressible element 517 will have a different weight load when compared to the weight load coming from three individual containers 316. Hence, this will be the determining factor for the controls to know whether one container or three containers are used.

Alternatively, other approaches may be adopted for achieving the automatic recognition described above. For example, instead of a weight load approach, a combination of contact sensors could be used.

It should be noted that the main housing 310 may be double-walled such that a gap 310b is created in between. The gap may be filled with, for example, air, and may contribute to the increase in the thermal insulation of the inside of the main housing 310, and thus, to the improvement of the cooking process.

Figure 3C:
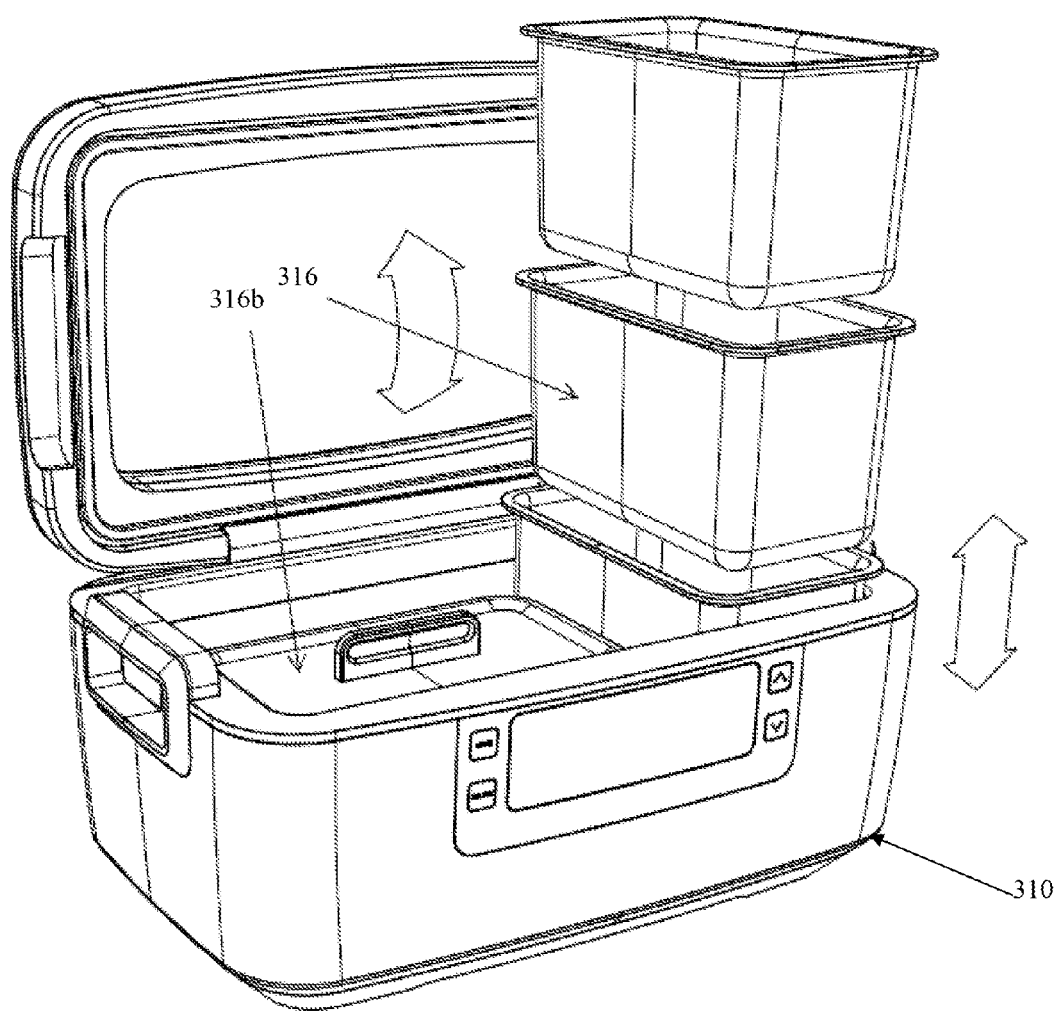
FIGS. 3c-d illustrate the nesting during storage of the three inner containers and their lids inside the rice cooker from FIG. 3a, according to another embodiment.
Figure 3D:
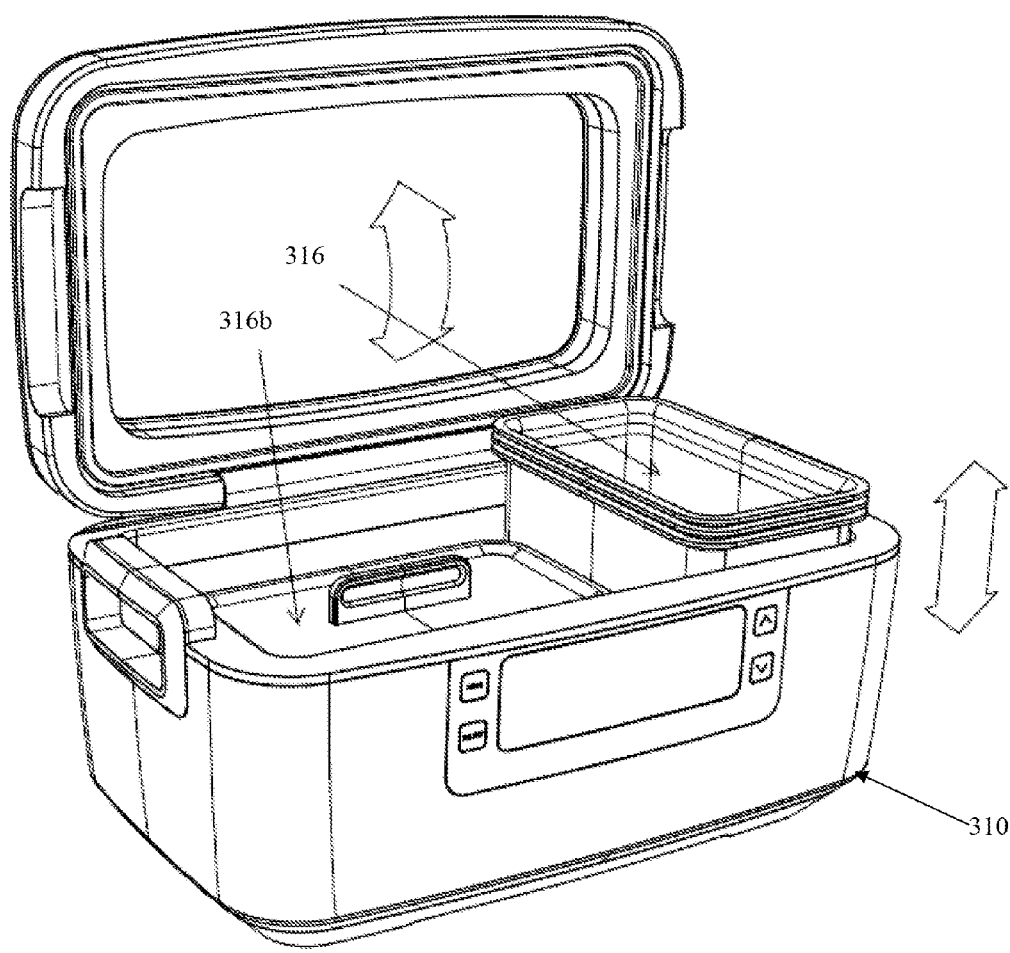

FIGS. 3c-d illustrate the nesting during storage or shipping of the three inner containers 316 and their lids inside the rice cooker from FIG. 3a, according to another embodiment. As shown, the three inner containers 316 may be configured such that they may be placed inside each other, and at one end of the inside of the main cooker housing 310, while their lids 316b may be stacked at the other end of main housing 310. This configuration may facilitate storage and/or shipping.

Figure 4A:
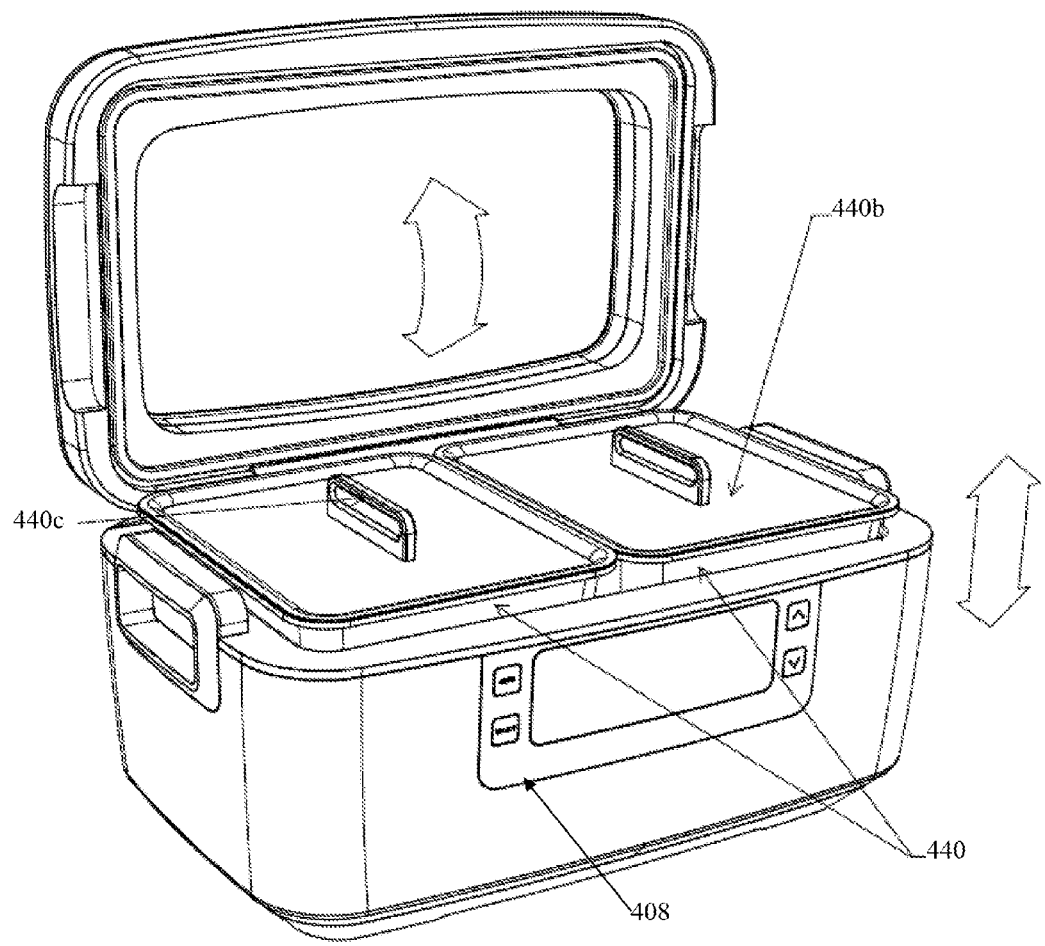
FIG. 4a illustrates a front-perspective view of a rice cooker with the lid open and having a two-container configuration, according to another embodiment.
Figure 4B:
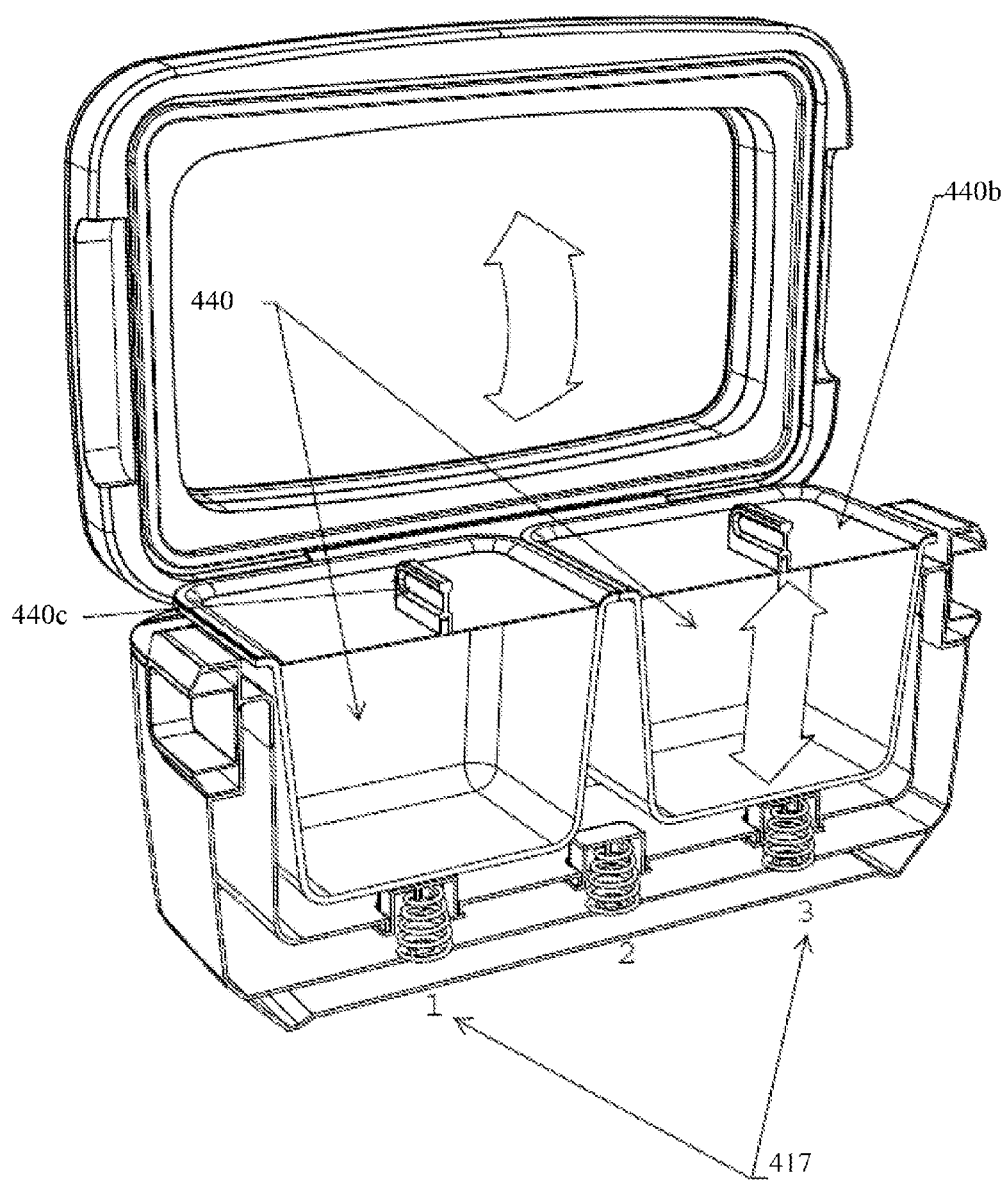

FIG. 4a illustrates a front-perspective view of a rice cooker with the lid open and having a two-container configuration, according to another embodiment. FIG. 4b illustrates a sectional view of the rice cooker from FIG. 4a. Except for the differences noted therein, the description above referring to the rice cooker having three inner bowls and depicted in FIGS. 3a-b applies to the two-container rice cooker depicted in FIGS. 4a-b, and is therefore incorporated herein by reference.

It should be noted in FIGS. 4a-b that the lids 440b of the inner containers 440 may have a handle 440c for easy grip and manipulation by user.

Figure 4C:
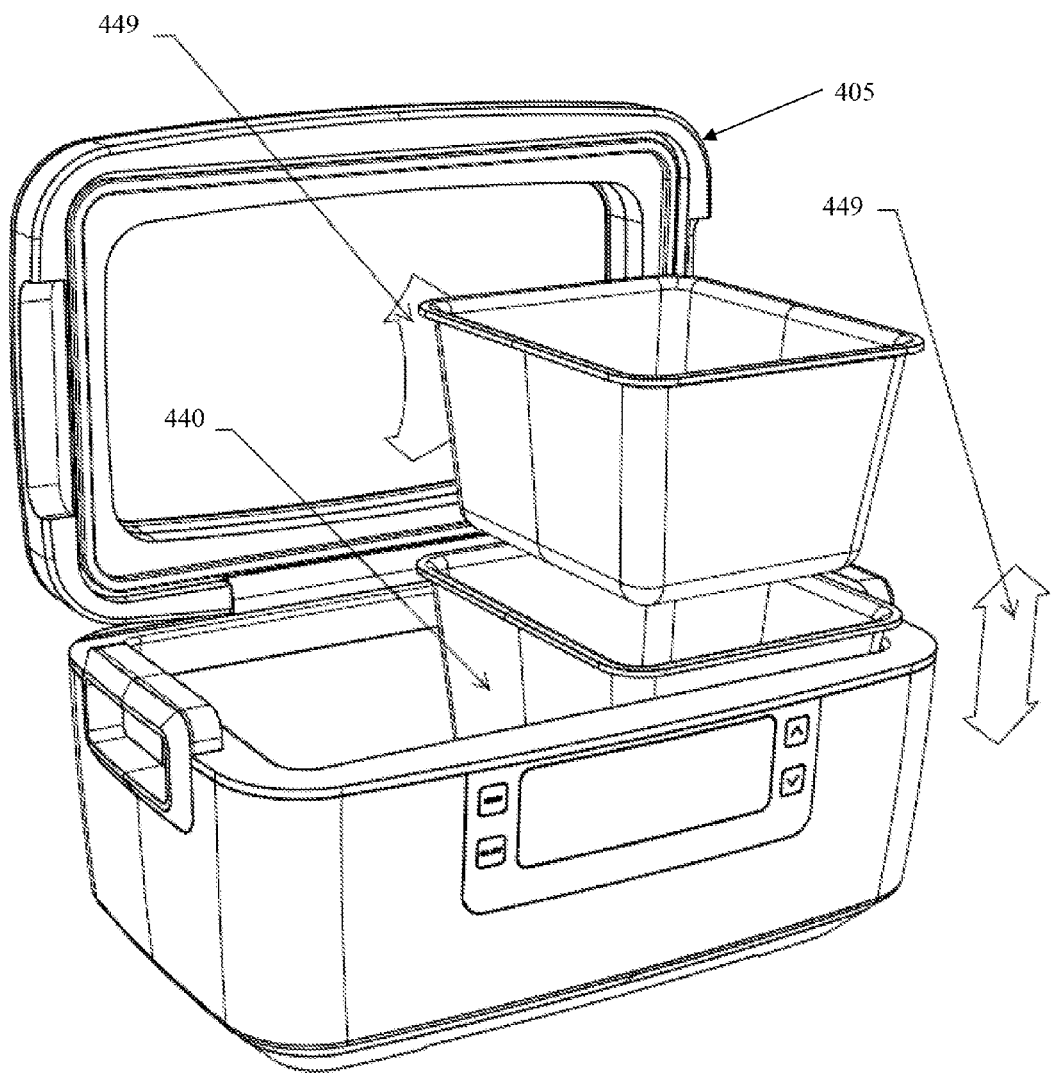
FIGS. 4c-d illustrate the nesting during storage of the two inner containers inside the rice cooker from FIG. 4a, according to another embodiment.
Figure 4D:
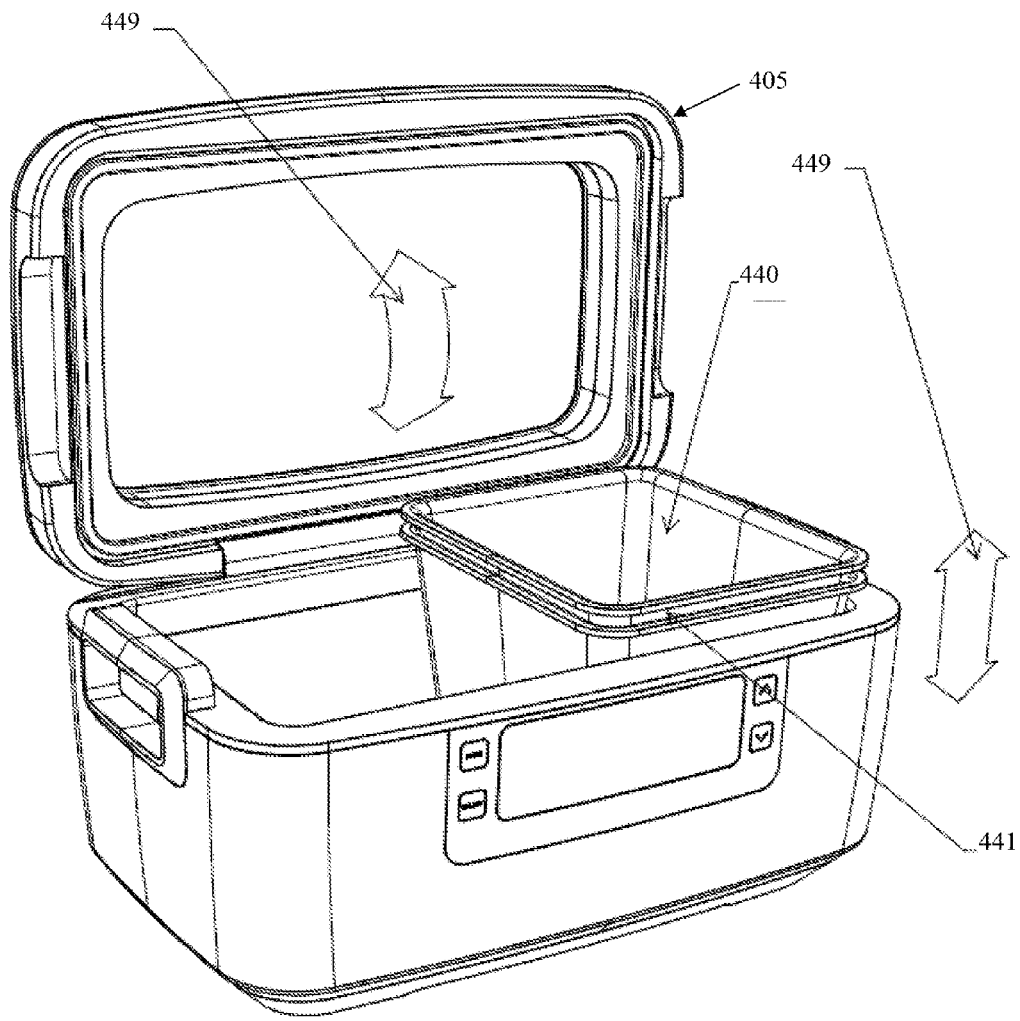

FIGS. 4c-d illustrate the nesting during storage or shipping of the two inner containers 440 inside the rice cooker from FIG. 4a, according to another embodiment. As shown, when the main lid 405 is opened fully (449), similarly as described above when referring to the three-container cooker, the two inner containers 440 may be nested (441) inside the cooker on one side and their lids (not shown) on the other side. Again, this configuration may facilitate storage and/or shipping.

It should be noted that the rice cooker and its inner containers may be sized such that, for example, the two bowls/inner containers 440 (FIGS. 4a-b) can be nested inside the one half of the large bowl 550 (FIGS. 5a-b) while the three bowls 316 (FIGS. 3a-b) may be nested inside the two bowls, and all lids for the two (440b) and three (316b) sets may be nested inside the other half of the large bowl 550, and the lid 550b of the large bowl 550 on top of everything; in other words, a configuration that allows all bowls and their lids to be nested inside the cooker for convenient and space saving storage in the user's kitchen and for savings on shipping costs.

FIG. 5a illustrates a front-perspective view of a rice cooker with the lid open and having a one-container configuration, according to another embodiment. FIG. 5b illustrates a sectional view of the rice cooker from FIG. 5a. As described earlier, the user may replace the three inner containers 316 (see FIGS. 3a-b) or the two inner containers 440 (see FIGS. 4a-b) with one large container 550 (see FIGS. 5a-b) such as when, for example, everybody agrees on the style, recipe and/or taste of the rice to be prepared.

Thus, the rice cooker disclosed herein provides superior versatility as it can be used to simultaneously prepare two, three or more styles of rice, or, if needed, only one style of rice for everybody.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A cooking system comprising a cooker having a single cooking housing being defined by an exterior bottom surface, exterior side walls, an upper surface, an interior bottom surface, and interior side walls, wherein there is a gap between the exterior side walls and the interior side walls, and wherein the interior bottom surface and the interior side walls define a single interior cavity having a first volume, a large inner container for receiving and cooking food having a second volume substantially equal with the first volume of the single interior cavity, the large inner container being configured for insertion into the single interior cavity when a user wants to cook a large quantity of a single style, recipe or taste of food, a plurality of inner container sets comprising a set of two inner containers and a set of three inner containers, each set of the plurality of inner container sets having a total volume substantially equal with the second volume of the large inner container and being configured to operationally replace the large inner container into the single interior cavity of the single cooking housing when the user wants to simultaneously cook a number of styles, recipes or tastes of food equal with the number of inner containers in each set, and at least one compressible element under each of the inner containers, wherein the at least one compressible element is compressed when a main lid of the rice cooker is closed, the compression being caused by the weight of the main lid, and decompressed when the main lid is opened such that the at least one compressible element causes the lifting of the inner containers to help a user grasp an upper edge of the inner containers and pull them out of the cooking housing, wherein, when a set of inner containers is operated, a set of cooking parameters for each inner container is independently selectable, thus, permitting the automatic and simultaneous preparation of different style, recipe or taste of food in each of the inner containers in the set.

2. The cooking system of claim 1, wherein the cooker is configured to provide automatic recognition of how many and which inner container is operational at a certain time and to display associated data on the display portion of a control panel.

3. The cooking system of claim 2, wherein the determining factor for the automatic recognition is the weight of the inner containers.

4. The cooking system of claim 1, wherein the inner containers in each set are nested inside each other, and the stack of inner containers obtained, together with the inner containers' lids, are nested inside the cooker for shipping or storage purposes.

5. The cooking system of claim 1, wherein the inner containers are equal in size in a set and unequal in another set.

6. The cooking system of claim 1, wherein the main lid of the cooker has a gasketed transparent portion, which allows users to monitor the cooking in the plurality of inner containers.

7. The cooking system of claim 1, wherein each one of the inner containers has a lid comprising a handle.

8. The cooking system of claim 1, wherein the set of cooking parameters comprises temperature and time.

9. The cooking system of claim 1, wherein the set of cooking parameters are automatically selected by user actuating a preprogrammed button for a particular style of rice.

10. The cooking system of claim 1, wherein the inner containers in each of the sets are different in size.

11. The cooking system of claim 1, wherein the inner containers in each of the sets are equal in size.

12. A cooking system comprising a cooker having a double-walled cooking housing being defined by an exterior bottom surface, exterior side walls, an upper surface, an interior bottom surface, and interior side walls, wherein there is a gap between the exterior side walls and the interior side walls, wherein the interior bottom surface and the interior side walls define a single interior cavity of a predetermined volume, configured to selectively and substantially fillably receive one inner container or a plurality of inner containers, the size of each inner container being inversely proportional to the number of inner containers received, such that the single interior cavity is always substantially filled; and at least one compressible element under each of the inner containers, wherein the at least one compressible element is compressed when a main lid of the rice cooker is closed, the compression being caused by the weight of the main lid, and decompressed when the main lid is opened such that the at least one compressible element causes the lifting of the inner containers to help a user grasp an upper edge of the inner containers and pull them out of the cooking housing; wherein, when the one inner container is received in the interior cavity, a user can prepare a large volume of a single style, recipe, or taste of food, or when the plurality of inner containers is received, the cooking system can operate the plurality of inner containers such that a set of cooking parameters for each inner container is independently selectable, thus, permitting the automatic and simultaneous preparation of different style, recipe or taste of food in each of the plurality of the inner containers.

13. A cooking system comprising a cooker having a double-walled cooking housing being defined by an exterior bottom surface, exterior side walls, an upper surface, an interior bottom surface, and interior side walls, wherein the interior bottom surface and the interior side walls define a single interior cavity of a predetermined volume, there is a gap between the exterior side walls and the interior side walls, wherein the single interior cavity is configured to receive, at a user's choice, only one large inner container, a plurality of various in size inner containers, or a plurality of equal in size inner containers, a size of each of the equal in size inner container being inversely proportional to a number of equal in size inner containers received, such that the interior cavity is always substantially filled and used; and at least one compressible element under each inner container, wherein the at least one compressible element is compressed when a main lid of the rice cooker is closed, the compression being caused by the weight of the main lid, and decompressed when the main lid is opened such that the at least one compressible element causes the lifting of the inner containers to help a user grasp an upper edge of the inner containers and pull them out of the cooking housing; wherein, when the only one large inner container is received in the interior cavity, the user can prepare a large volume of a single style, recipe, or taste of food, and, when the plurality of various in size inner containers or when the plurality of equal in size inner containers is used, a set of cooking parameters for each inner container is independently selectable, thus, permitting the automatic and simultaneous preparation of different style, recipe or taste of food in each of the inner containers.

* * * * *